(12) United States Patent
Wang

(10) Patent No.: US 12,052,716 B2
(45) Date of Patent: Jul. 30, 2024

(54) BSR TRIGGERING METHOD AND DEVICE, AND STORAGE MEDIUM AND USER EQUIPMENT

(71) Applicant: SPREADTRUM COMMUNICATIONS (SHANGHAI) CO., LTD., Shanghai (CN)

(72) Inventor: Tingting Wang, Shanghai (CN)

(73) Assignee: SPREADTRUM COMMUNICATIONS (SHANGHAI) CO., LTD., Shanghai (CN)

(*) Notice: Subject to any disclaimer, the term of this patent is extended or adjusted under 35 U.S.C. 154(b) by 437 days.

(21) Appl. No.: 17/427,830

(22) PCT Filed: Jan. 8, 2020

(86) PCT No.: PCT/CN2020/070861
§ 371 (c)(1),
(2) Date: Aug. 2, 2021

(87) PCT Pub. No.: WO2020/156067
PCT Pub. Date: Aug. 6, 2020

(65) Prior Publication Data
US 2022/0150938 A1 May 12, 2022

(30) Foreign Application Priority Data
Jan. 31, 2019 (CN) .................. 201910098408.X

(51) Int. Cl.
*H04W 72/0446* (2023.01)
*H04W 56/00* (2009.01)
(Continued)

(52) U.S. Cl.
CPC ......... *H04W 72/21* (2023.01); *H04W 56/001* (2013.01); *H04W 72/23* (2023.01)

(58) Field of Classification Search
CPC ..... H04W 72/12; H04W 74/08; H04W 28/02; H04W 72/1268; H04W 36/22;
(Continued)

(56) References Cited

U.S. PATENT DOCUMENTS

2010/0077100 A1    3/2010  Hsu et al.
2014/0022933 A1*   1/2014  Yi .................. H04L 43/0888
                                                 370/253
(Continued)

FOREIGN PATENT DOCUMENTS

CN    102111751 A    6/2011
CN    101483918 B    11/2011
(Continued)

OTHER PUBLICATIONS

3rd Generation Partnership Project; Technical Specification Group Radio Access Network; Evolved Universal Terrestrial Radio Acces (E-UTRA); Medium Access Control (MAC) protocol specification (Release 13), V13.50.0 (Mar. 2017); 93 page.
(Continued)

*Primary Examiner* — Tu X Nguyen
(74) *Attorney, Agent, or Firm* — CANTOR COLBURN LLP

(57) ABSTRACT

A BSR triggering method and device, and a storage medium are provided. The method comprises: determining uplink data arriving at one time in an MAC entity, the uplink data corresponding to a logical channel, and the logical channel belonging to a logical channel group; determining a fixed value corresponding to an amount of data arriving at each time in the logical channel, and a transmission period and a time offset of a service carried by the logical channel; if part of the amount of the uplink data exceeding the fixed value reaches a first preset threshold, or determining period time points according the transmission period and the time offset, if a time difference between a time point when the uplink data arrives and a next period time point after the time point reaches a second preset threshold, triggering a first BSR which includes the amount of the uplink data.

20 Claims, 7 Drawing Sheets

(51) Int. Cl.
*H04W 72/21* (2023.01)
*H04W 72/23* (2023.01)

(58) Field of Classification Search
CPC . H04W 72/56; H04W 72/232; H04W 72/231; H04W 24/10; H04W 72/0446; H04W 76/38; H04W 12/61
See application file for complete search history.

(56) References Cited

U.S. PATENT DOCUMENTS

| | | |
|---|---|---|
| 2018/0192319 A1 | 7/2018 | Jiang |
| 2018/0368157 A1 | 12/2018 | Jeon et al. |
| 2020/0077434 A1 | 3/2020 | Kim et al. |
| 2020/0305167 A1 | 9/2020 | Freda et al. |

FOREIGN PATENT DOCUMENTS

| | | |
|---|---|---|
| CN | 106714213 A | 5/2017 |
| CN | 107277856 A | 10/2017 |
| CN | 108540994 A | 9/2018 |
| EP | 2166810 A2 | 3/2010 |
| WO | 2015116866 A1 | 8/2015 |
| WO | 2017172479 A1 | 10/2017 |
| WO | 2018084524 A1 | 5/2018 |

OTHER PUBLICATIONS

International Search Report for International Application No. PCT/JP2020/070861; Date of Mailing, Apr. 8, 2020.
LG Electronics Inc. "BSR enhancement for predictable but varying TSN traffic" 3GPP TSG-RAN WG2, Meeting #104, R2-1818359, Spokane, USA, Nov. 16, 2018; 2 pages.
EPO Extended European Search Report corresponding to EP Application No. 20749022.8; Mailing Date Aug. 10, 2022.
IN Office Action for corresponding IN Application No. IN202117037198; Mailed on Aug. 30, 2022.

* cited by examiner

BSR TRIGGERING METHOD AND DEVICE, AND STORAGE MEDIUM AND USER EQUIPMENT

CROSS-REFERENCE TO RELATED APPLICATIONS

This is the U.S. national stage of Application No. PCT/CN2020/070861, filed on Jan. 8, 2020. Priority under 35 U.S.C. § 119(a) and 35 U.S.C. § 365(b) is claimed from Chinese Patent Application No. 201910098408.X, filed on Jan. 31, 2019, the disclosure of which is incorporated herein by reference.

TECHNICAL FIELD

The present disclosure generally relates to communication technology field, and more particularly, to a method and a device for triggering a BSR, and a storage medium.

BACKGROUND

Arrival time of packets in a Time-Sensitive Networking (TSN) flow has a fixed time offset and period. Configured grant may be used to support deterministic periodic services. The RAN1 #95 meeting has agreed to support the configuration and activation of multiple sets of configurations of configured grant on a given Band Width Part (BWP) in a serving cell, so as to support a variety of different services/traffic types (which may include multiple Industrial/TSN streams with different characteristics), and to enhance transmission reliability and reduce transmission delay.

In addition, a user equipment (UE) or a core network may notify a base station of some related informations about traffic patterns of an uplink TSN flow, which facilitates the base station to accurately configure uplink configured/Semi-Persistent Scheduling (SPS) resources for the UE.

Each Logical Channel (LCH) may be configured into a Logical Channel Group (LCG), which is configured through a logicalChannelGroup field in Information Element (IE) LogicalChannelConfig, wherein the logicalChannelGroup field is optional. If the logicalChannelGroup field exists, the LCH is configured to an indicated LCG; otherwise, the LCH is not configured to any LCG. In existing protocols, a maximum number of LCGs is 8. A Media Access Control (MAC) entity may determine an amount of uplink data to be transmitted on an LCH based on data amount calculation steps in TSs 38.322 and 38.323. When a Buffer State Report (BSR) is reported, an amount of uplink data to be transmitted on an LCG is reported, wherein the amount of uplink data to be transmitted on the LCG is a sum of amounts of uplink data to be transmitted on all LCHs included in the LCG.

Any of following events will trigger a BSR. In an MAC entity, an LCH belonging to a certain LCG has new uplink data arriving, and the LCH which has the arriving uplink new data has a priority higher than any LCH which belongs to the certain LCG and has uplink data to be transmitted; or all LCHs configured with an LCG have no uplink data to be transmitted; in this case, a triggered BSR is called 'Regular BSR'. Uplink resources are allocated and a size of padding bits is greater than or equal to a size of a BSR MAC CE and a sub-header thereof; in this case, a BSR is triggered and the triggered BSR is called 'Padding BSR'. A retxBSR-Timer expires, and at least one LCH configured with LCG has uplink data to be transmitted; in this case, a BSR is triggered and the triggered BSR is called 'Regular BSR'. And a periodicBSR-Timer expires; in this case, a BSR is triggered and the triggered BSR is called 'Periodic BSR'.

Some flow in the above periodic services may have jitter, that is, an amount of data arriving at one time is more than or less than a fixed size, or a point when the data arrives is deviated from a fixed point determined by the fixed offset and period.

However, in existing techniques, if the LCH corresponding to the flow is configured in a certain LCG, and according to the existing BSR trigger conditions, the LCH corresponding to the flow needs to determine whether to trigger a BSR every time new data arrives, so as to notify the base station of an amount of the new data to be transmitted; in addition, a BSR triggered by other conditions also needs to include the amount of the new data to be transmitted on the LCH. However, if the base station already knows the related informations about traffic patterns of the flow, the BSR reporting is not required, which also causes a waste of uplink resources. On the other hand, if no LCG is configured for the LCH corresponding to the flow, and according to the existing BSR trigger conditions, the LCH corresponding to the flow does not determine whether to trigger a BSR every time new data arrives, so as to notify the base station of an amount of the new data to be transmitted; and a BSR triggered by other conditions does not include an amount of the new data to be transmitted on the LCH. Therefore, when the flow have jitter, the BSR cannot be reported, resulting in some unknown data amount cannot be notified to the base station in time, so that the base station cannot allocate resources to the UE in time and data cannot be transmitted in time. For some services which have high requirements for transmission delay, delay requirements cannot be met and communication quality is reduced.

SUMMARY

Embodiments of the present disclosure may achieve effective utilization of resources and effective transmission of data while triggering a BSR.

In an embodiment of the present disclosure, a method for triggering a BSR is provided, including: determining an uplink data arriving at one time in a Media Access Control (MAC) entity, wherein the uplink data corresponds to a Logical Channel (LCH), and the logical channel belongs to a Logical Channel Group (LCG); determining a fixed value corresponding to an amount of data arriving each time in the logical channel, and determining a transmission period and a time offset of a service carried by the logical channel; and determining periodic time points according to the transmission period and the time offset, and based on a part of an amount of the uplink data which exceeds the fixed value reaching a first preset threshold or a time difference between a time point of arrival of the uplink data and a next periodic time point after the time point of arrival of the uplink data reaching a second preset threshold, triggering a first BSR, wherein the first BSR comprises the amount of the uplink data.

Optionally, traffic patterns of the logical channel are sent to a base station in advance and are successfully received by the base station.

Optionally, said triggering a first BSR includes: receiving a signaling corresponding to the logical channel; in response to the signaling comprising a trigger condition indication, determining whether the part of the amount of the uplink data exceeding the fixed value reaches the first preset threshold, wherein the trigger condition indication comprises the first preset threshold; and based on the part of the amount of the uplink data which exceeds the fixed value reaching the first preset threshold, triggering the first BSR.

Optionally, said triggering a first BSR includes: receiving a signaling corresponding to the logical channel; in response to the signaling comprising a trigger condition indication, determining periodic time points according to the transmission period and the time offset, and determining whether a time difference between a time point when the uplink data arrives and a next periodic time point after the time point when the uplink data arrives reaches a second preset threshold, wherein the trigger condition indication comprises the second preset threshold; and based on the time difference between the time point of arrival of the uplink data and the next periodic time point after arrival of the time point reaching the second preset threshold, triggering the first BSR.

Optionally, the method further includes: receiving a signaling corresponding to the logical channel, wherein the service carried by the logical channel is a periodic service or a non-periodic service; in response to the signaling not comprising a trigger condition indication, determining whether a priority of the logical channel is higher than priorities of other logical channels which belong to the logical channel group and have data to be transmitted, wherein signalings corresponding to the other logical channels do not comprise the trigger condition indication, or when a number of the other logical channels is more than one, signalings corresponding to a part of the other logical channels comprise the trigger condition indication, and signalings corresponding to a remaining part of the other logical channels do not comprise the trigger condition indication; and based on the priority of the logical channel higher than the priorities of the other logical channels which belong to the logical channel group and have data to be transmitted, triggering a second BSR, wherein the second BSR comprises or does not comprise an amount of data to be transmitted indicated by a trigger condition indication comprised in a corresponding signaling of a logical channel.

Optionally, the method further includes: receiving a signaling corresponding to the logical channel, wherein the service carried by the logical channel is a periodic service or a non-periodic service; in response to the signaling not comprising a trigger condition indication, determining whether no uplink data has arrived in anyone of other logical channels belonging to the logical channel group, wherein signalings corresponding to the other logical channels do not comprise the trigger condition indication, or when a number of the other logical channels is more than one, signalings corresponding to a part of the other logical channels comprise the trigger condition indication, and signalings corresponding to a remaining part of the other logical channels do not comprise the trigger condition indication; and based on none of the other logical channels which belongs to the logical channel group having uplink data arrived, triggering a third BSR, wherein the third BSR comprises or does not comprise an amount of data to be transmitted indicated by a trigger condition indication comprised in a corresponding signaling of a logical channel.

Optionally, the method further includes: receiving signalings corresponding to all logical channels; determining whether a current User Equipment (UE) has available uplink resources and whether a size of padding bits reaches a size of a BSR MAC CE and a sub-header thereof; and based on the current UE having available uplink resources and the size of padding bits reaching the size of a BSR MAC CE and the sub-header thereof, triggering a fourth BSR, wherein the fourth BSR comprises or does not comprise an amount of data to be transmitted indicated by a trigger condition indication comprised in a corresponding signaling of a logical channel.

Optionally, the method further includes: receiving signalings corresponding to all logical channels; based on a retxBSR-Timer expiring and at least one logical channel, which belongs to the logical channel group and has a corresponding signaling that does not comprise a trigger condition indication, having data to be transmitted, triggering a fifth BSR, wherein the fifth BSR comprises or does not comprise an amount of data to be transmitted indicated by a trigger condition indication comprised in a corresponding signaling of a logical channel; or based on a retxBSR-Timer expiring and at least one logical channel which belongs to the logical channel group having data to be transmitted, triggering the fifth BSR, wherein the fifth BSR comprises or does not comprise an amount of data to be transmitted indicated by a trigger condition indication comprised in a corresponding signaling of a logical channel.

Optionally, the method further includes: receiving signalings corresponding to all logical channels; and based on a periodicBSR-Timer expiring, triggering a sixth BSR, wherein the sixth BSR comprises or does not comprise an amount of data to be transmitted indicated by a trigger condition indication comprised in a corresponding signaling of a logical channel.

Optionally, the signaling includes: a Radio Resource Control (RRC) signaling, a MAC signaling, a physical layer signaling or a logical channel configuration signaling.

In an embodiment of the present disclosure, a device for triggering a BSR is provided, including: an uplink data determining module, adapted to determine an uplink data arriving at one time in a Media Access Control (MAC) entity, wherein the uplink data corresponds to a Logical Channel (LCH), and the logical channel belongs to a Logical Channel Group (LCG); a parameter determining module, adapted to determine a fixed value corresponding to an amount of data arriving each time in the logical channel, and determine a transmission period and a time offset of a service carried by the logical channel; and a BSR triggering module, adapted to determine periodic time points according the transmission period and the time offset, and adapted to, based on a part of an amount of the uplink data which exceeds the fixed value reaching a first preset threshold or a time difference between a time point of arrival of the uplink data and a next periodic time point after the time point of arrival of the uplink data reaching a second preset threshold, trigger a first BSR, wherein the first BSR comprises the amount of the uplink data.

In an embodiment of the present disclosure, a storage medium having computer instructions stored therein is provided, wherein once the computer instructions are executed, the above method is performed.

In an embodiment of the present disclosure, a user equipment including a memory and a processor is provided, wherein the memory has computer instructions stored therein, and when the processor executes the computer instructions, the above method is performed.

DETAILED DESCRIPTION

Figure 1:
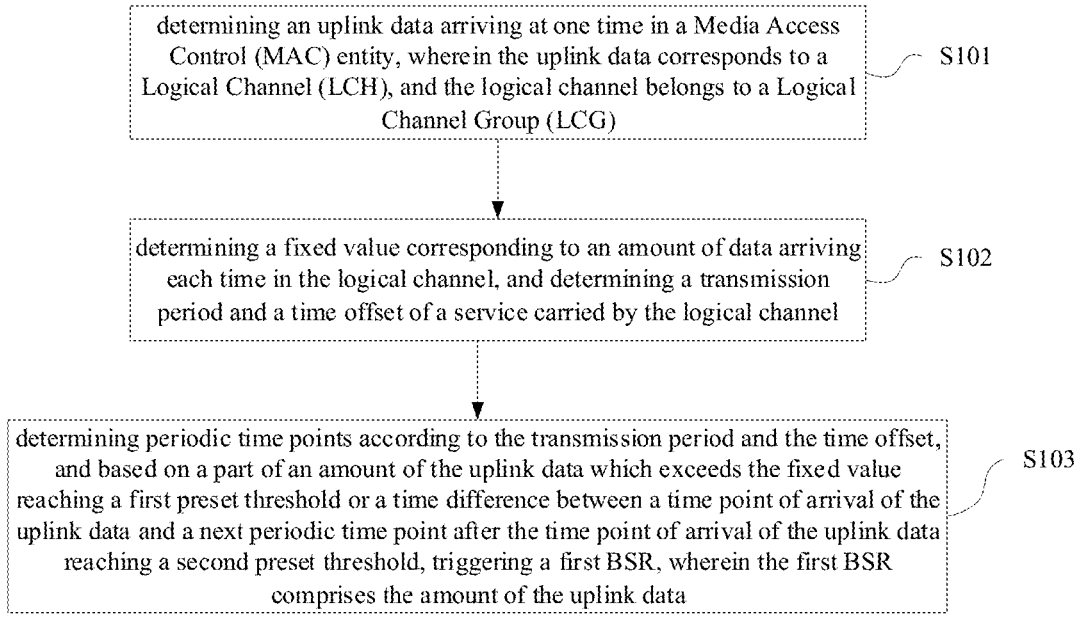
FIG. 1 schematically illustrates a flow chart of a method for triggering a BSR according to an embodiment.

In some embodiments, if the LCH corresponding to the flow is configured in a certain LCG, and according to the existing BSR trigger conditions, the LCH corresponding to the flow needs to determine whether to trigger a BSR every time new data arrives, so as to notify the base station of an amount of the new data to be transmitted; in addition, a BSR triggered by other conditions also needs to include the amount of the new data to be transmitted on the LCH. However, if the base station already knows the related informations about traffic patterns of the flow, the BSR reporting is not required, which also causes a waste of uplink resources. On the other hand, if no LCG is configured for the LCH corresponding to the flow, and according to the existing BSR trigger conditions, the LCH corresponding to the flow does not determine whether to trigger a BSR every time new data arrives, so as to notify the base station of an amount of the new data to be transmitted; and a BSR triggered by other conditions does not include an amount of the new data to be transmitted on the LCH. Therefore, when the flow have jitter, the BSR cannot be reported, resulting in some unknown data amount cannot be notified to the base station in time, so that the base station cannot allocate resources to the UE in time and data cannot be transmitted in time. For some services which have high requirements for transmission delay, delay requirements cannot be met and communication quality is reduced.

Specifically, inventors of the present disclosure found, in the prior art, that a certain LCH does not trigger a BSR and an amount of data to be transmitted on the LCH is not reported to a network, may be implemented in the following ways: do not configure any LCG for the certain LCH;
the certain LCH is not configured with BSR trigger function;
when another LCH has new data arriving, a priority of the certain LCH is compared with priorities of all other LCHs which are configured with LCG and have data to be transmitted to determine whether to trigger a BSR, and the certain LCH is ignored;
since the BSR is reported in the unit of LCG and the LCH does not belong to any LCG, the amount of data to be transmitted on the LCH is reported to the network; and
when a retxBSR-Timer times out, whether at least one LCH configured with LCG has uplink data to be transmitted is checked to determine whether to trigger a BSR, and the certain LCH is ignored.

In other words, in the prior art, a certain LCH can only be configured to always have the BSR trigger function or not have the BSR trigger function.

The inventors of the present disclosure also found that: as for periodicity of a flow having both periodicity and jitter characteristics, if a UE or a core network informs a base station of some related informations about traffic patterns (such as a fixed offset, a fixed period, and a data packet size), the base station knows that a fixed amount of data will arrive at a fixed time point determined by the fixed offset and the fixed period, then, according to the existing BSR trigger conditions, a LCH corresponding to the flow does not need to determine whether to trigger a BSR every time new data arrives to inform the base station of the amount of data to be transmitted; and a BSR triggered by other conditions does not need to include the amount of data to be transmitted on the LCH when the BSR is reported. As for jitter characteristics of the flow having both periodicity and jitter characteristics, if an amount of an uplink data that arrives at one time exceeds the fixed amount and an excess amount reaches a predetermined threshold, or a time difference between a time point when a data arrives and the fixed time point of arrival determined by the fixed offset and the fixed period is greater than a predetermined threshold, the amount of data to be transmitted on the LCH needs to be reported.

In embodiments of the present disclosure, for an uplink data having both periodicity and jitter characteristics, only when a jitter occurs (that is, an amount of an uplink data that arrives at one time exceeds a fixed value and an excess amount reaches a first preset threshold, or a time difference between an arrival time point of the uplink data and a next periodic time point after the arrival time point reaches a second preset threshold), a first BSR will be triggered, which can avoid waste of uplink resources by sending unnecessary BSRs on the uplink resources when jitter does not occur; and the amount of the uplink data is reported through the first BSR, so that a base station can obtain the amount of the uplink data which is affected by the jitter and is unknown to the base station and then can configure a corresponding uplink resource for the uplink data, thereby ensuring timely and effective transmission of the uplink data and reducing data transmission delay.

In order to clarify the object, characteristic and advantages of embodiments of the present disclosure, embodiments of present disclosure will be described clearly in detail in conjunction with accompanying drawings.

FIG. 1 schematically illustrates a flow chart of a method for triggering a BSR according to an embodiment.

The method for triggering a BSR shown in FIG. 1 includes S101 to S103.

In S101: determining an uplink data arriving at one time in an MAC entity, wherein the uplink data corresponds to a LCH, and the logical channel belongs to a LCG;

In S102: determining a fixed value corresponding to an amount of data arriving each time in the logical channel, and determining a transmission period and a time offset of a service carried by the logical channel; and In S103: determining periodic time points according the transmission period and the time offset, and if a part of an amount of the uplink data exceeding the fixed value reaches a first preset threshold or if a time difference between a time point when the uplink data arrives and a next periodic time point after the time point when the uplink data arrives reaches a second preset threshold, triggering a first BSR, wherein the first BSR includes the amount of the uplink data.

It should be noted out that sequence numbers of the steps in the embodiment does not limit execution order of the steps.

In some embodiments, in S101, in the MAC entity, if the uplink data arrives on the LCH belonging to the LCG, the uplink data is a new data to be transmitted. Specifically, the logical channel belongs to a logical channel group, that is, the logical channel is configured to the logical channel group, and specific informations of the logical channel group is not limited in the embodiments of the present invention.

In some embodiments, the uplink data arriving at one time in the MAC entity includes all uplink data that arrive in the MAC entity at a same time or within a certain time period.

In some embodiments, it can be configured through a logicalChannelGroup field in IE LogicalChannelConfig. If the logicalChannelGroup field exists, the LCH is configured to the LCG; otherwise, the LCH is not configured to any LCG.

In some embodiments, in S102, if the service carried by the logical channel is a periodic service, the fixed value corresponding to the amount of data arriving each time of the periodic service, and the transmission period and the time offset of the service carried by the logical channel may be determined. Specifically, the periodic time points may be determined according to the transmission period and the time offset.

In some embodiments, the fixed value corresponding to the amount of data represents an amount of data that should arrive each time in the periodic service, and the time offset represents an offset between a time point of a data arrival (for example, a first data arrival) and a reference time, wherein the reference time may be, for example, subframe 0 of a system frame 0, or any other feasible time point, which is not limited in the embodiments of the present disclosure.

Figure 2:
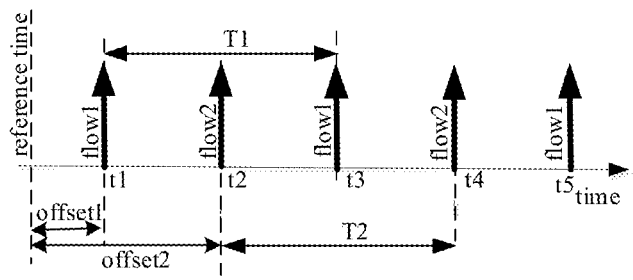
FIG. 2 is a schematic diagram of a periodic transmission mode of a periodic service according to an embodiment.

For periodic services, please refer to FIG. 2. Both flow1 and flow2 are periodic services. Specifically, the flow1 has a time offset offset1, a period T1, and a fixed value S1 (not shown in the figure). The flow2 has a time offset offset2, a period T2, and a fixed value S2 (not shown in the figure). Specifically, according to the time offset offset1 and the period T1, time points t1, t3, t5 . . . of the flow1 may be determined. According to the time offset offset2 and the period T2, time points t2, t4 . . . of the flow2 may be determined.

In some embodiments, in S103, if the part of the amount of the uplink data exceeding the fixed value reaches the first preset threshold or if the time difference between the time point when the uplink data arrives and the next periodic time point after the time point when the uplink data arrives reaches a second preset threshold, the first BSR is triggered.

It should be noted that the first preset threshold and the second preset threshold may be configured according to actual application scenarios, which are not limited in the embodiments of the present disclosure.

In an embodiment, as shown in FIG. 2, as for the time points t1, t3, and t5 of the flow1, if a time point t when the uplink data arrives is between t1 and t3, whether a time difference between the time point t and the time point t3 reaches the second preset threshold is determined.

In an embodiment, the first BSR reported to the base station includes the amount of the uplink data, that is, includes the amount of data to be transmitted in the logical channel which has jitter. In another example, the first BSR includes a total amount of data to be transmitted in each logical channel belonging to the logical channel group.

In some embodiments, traffic patterns of the logical channel are sent to the base station in advance and are successfully received by the base station.

In some embodiments, the traffic patterns may be sent by a user equipment to the base station, or may be sent by a core network to the base station.

In some embodiments, the traffic patterns of the logical channel include the fixed value corresponding to the amount of data arriving each time in the logical channel, and the transmission period and the time offset of the service carried by the logical channel.

In other words, after the base station successfully obtains the traffic patterns (such as the period, the time offset, and the fixed value) of the logical channel, if the logical channel does not have a jitter, the traffic patterns of the logical channel are not changed, so that the logical channel does not need to trigger a BSR. Only when the logical channel has a jitter, if the base station schedules resources according to the original traffic patterns, delay requirements of the UE cannot be met, and a BSR needs to be triggered to report an accurate amount of data to be transmitted.

According to the embodiments of the present disclosure, for the uplink data having both periodicity and jitter characteristics, only when a jitter occurs (that is, the amount of the uplink data that arrives at one time exceeds the fixed value and the excess amount reaches the first preset threshold, or the time difference between the arrival time point of the uplink data and the next periodic time point after the arrival time point reaches the second preset threshold), the first BSR is triggered, which can avoid waste of uplink resources by sending unnecessary BSRs on the uplink resources when jitter does not occur; and the amount of the uplink data is reported through the first BSR, so that the base station can obtain the amount of the uplink data which is affected by the jitter and is unknown to the base station and then can configure a corresponding uplink resource for the uplink data, thereby ensuring timely and effective transmission of the uplink data and reducing data transmission delay.

Figure 3:
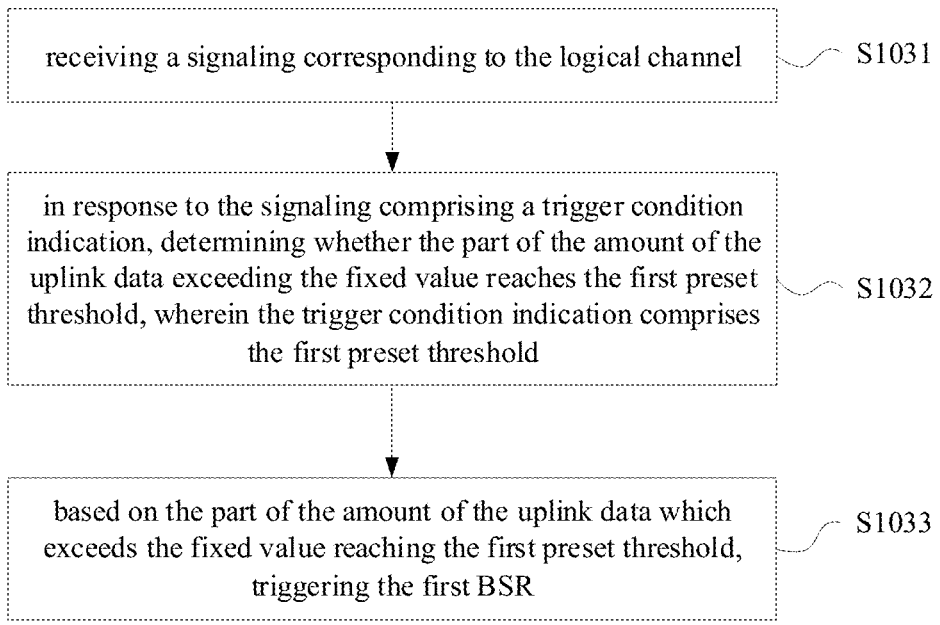
FIG. 3 schematically illustrates a flow chart of S103 in FIG. 1 according to an embodiment.

FIG. 3 schematically illustrates a flow chart of S103 in FIG. 1 according to an embodiment.

In S1031, a signaling corresponding to the logical channel is received.

In S1032, in response to the signaling including a trigger condition indication, whether the part of the amount of the uplink data exceeding the fixed value reaches the first preset threshold is determined, wherein the trigger condition indication includes the first preset threshold.

In S1033, if the part of the amount of the uplink data exceeding the fixed value reaches the first preset threshold, the first BSR is triggered.

Specifically, each logical channel is configured with a corresponding signaling, which may be an existing logical channel configuration signaling, wherein an IE LogicalChannelConfig is configured with relevant parameters of the logical channel; or may be a newly-added RRC signal, a MAC signaling, or a physical layer signaling.

In some embodiments, the signaling corresponding to the logical channel may include a trigger condition indication, which may be carried in the newly added signaling, or may be carried in the existing logical channel configuration signaling. In an embodiment, a dataVolume field may be configured in the existing logical channel configuration signaling or in the newly-added signaling to indicate the first preset threshold.

When the signaling corresponding to the logical channel includes the trigger condition indication, the determination operation is performed, that is, whether the part of the amount of the uplink data exceeding the fixed value reaches the first preset threshold is determined, so as to determine whether to trigger the first BSR.

Figure 4:
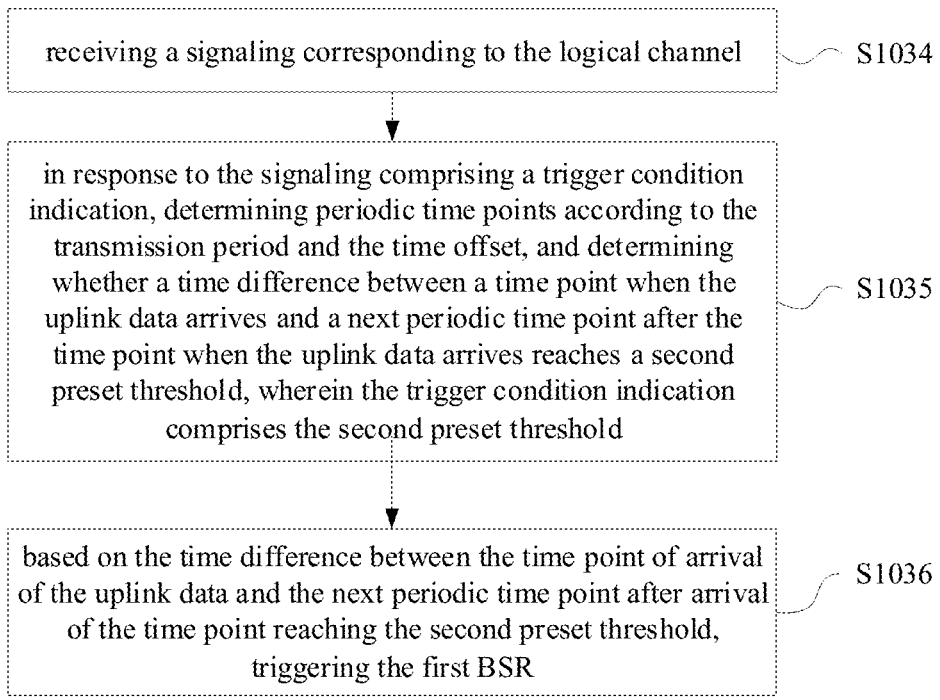
FIG. 4 schematically illustrates a flow chart of S103 in FIG. 1 according to another embodiment.

FIG. 4 schematically illustrates a flow chart of S103 in FIG. 1 according to another embodiment. S103 shown in FIG. 1 may include S1034 to S1036.

In S1034, a signaling corresponding to the logical channel is received.

In S1035, in response to the signaling including a trigger condition indication, periodic time points are determined according the transmission period and the time offset, and whether a time difference between a time point when the uplink data arrives and a next periodic time point after the time point when the uplink data arrives reaches a second preset threshold is determined, wherein the trigger condition indication includes the second preset threshold.

In S1036, if the time difference between the time point when the uplink data arrives and the next periodic time point after the time point when the uplink data arrives reaches the second preset threshold, the first BSR is triggered.

In some embodiments, the signaling corresponding to the logical channel may include a trigger condition indication, which may be carried in a newly added signaling, or may be carried in an existing logical channel configuration signaling. In an embodiment, a timeGap field may be configured in the existing logical channel configuration signaling or in the newly-added signaling to indicate the second preset threshold.

When the signaling corresponding to the logical channel includes the trigger condition indication, the determination operation is performed, that is, whether the time difference between the time point when the uplink data arrives and the next periodic time point after the time point when the uplink data arrives reaches the second preset threshold is determined, so as to determine whether to trigger the first BSR.

In the embodiments described above, the signaling corresponding to the logical channel includes the trigger condition indication. In this case, the service carried by the logical channel is usually a periodic service. In embodiments of the present disclosure described below, the signaling corresponding to the logical channel does not include a trigger condition indication. In this case, the service carried by the logical channel is usually a non-periodic service, or the service carried by the logical channel is a periodic service whose traffic patterns has not been successfully received by the base station.

Figure 5:
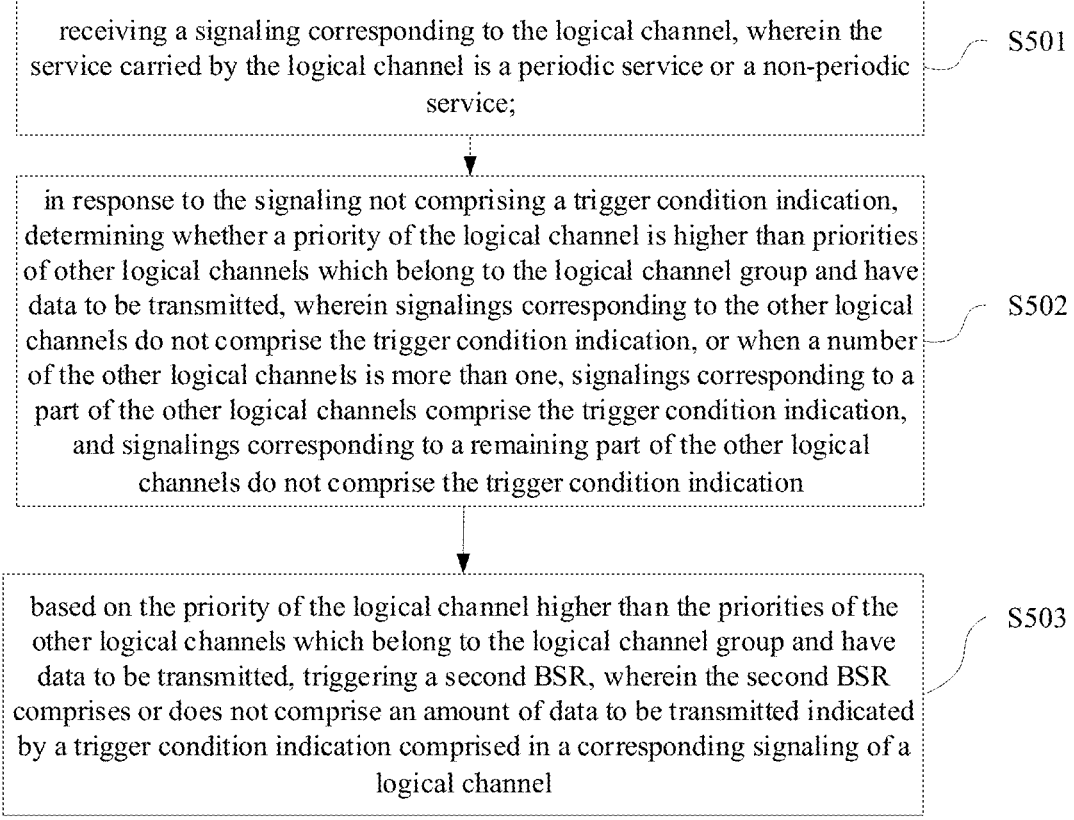
FIG. 5 schematically illustrates a flow chart of a method for triggering a BSR according to another embodiment.

FIG. 5 schematically illustrates a flow chart of a method for triggering a BSR according to another embodiment. In addition to the steps shown in FIG. 1, the method for triggering a BSR also include the following steps:

S501: receiving the signaling corresponding to the logical channel, wherein the service carried by the logical channel is a periodic service or a non-periodic service;

S502: in response to the signaling not including a trigger condition indication, determining whether a priority of the logical channel is higher than priorities of other logical channels which belong to the logical channel group and have data to be transmitted, wherein signalings corresponding to the other logical channels do not include the trigger condition indication, or when a number of the other logical channels is more than one, signalings corresponding to a part of the other logical channels include the trigger condition indication, and signalings corresponding to a remaining part of the other logical channels do not include the trigger condition indication; and S503: if the priority of the logical channel is higher than the priorities of the other logical channels which belong to the logical channel group and have data to be transmitted, a second BSR is triggered, wherein the second BSR includes or does not include an amount of data to be transmitted indicated by a trigger condition indication included in a corresponding signaling of a logical channel.

In the embodiment, the service carried by the logical channel may be a periodic service or a non-periodic service. The logical channel is pre-configured with the priority.

When the signaling corresponding to the logical channel does not include the trigger condition indication, whether the priority of the logical channel is higher than the priorities of the other logical channels which belong to the logical channel group and have data to be transmitted is determined. The signalings corresponding to the other logical channels may not include the trigger condition indication, or may include the trigger condition indication.

It can be understood that the number of the other logical channels may be one or more. When the number of the other logical channels is more than one, the priority of the logical channel is compared with the priorities of the multiple other logical channels.

If the priority of the logical channel is higher than the priorities of the other logical channels which belong to the logical channel group and have data to be transmitted, the second BSR is triggered. Specifically, the second BSR includes an amount of data to be transmitted in the logical channel group to which the logical channel belongs, and may also include amounts of data to be transmitted in other logical channel groups, wherein an amount of data to be transmitted in each logical channel group is a total amount of data to be transmitted in all logical channels belonging to the logical channel group. Optionally, the second BSR does not include an amount of data to be transmitted indicated by a trigger condition indication included in a corresponding signaling of a logical channel. In other words, for each logical channel group, the second BSR includes a total amount of data to be transmitted in all of the other logical channels included in the logical channel group, except an amount of data to be transmitted indicated by a trigger condition indication included in a corresponding signaling of a logical channel. For example, for Logical Channel 1 which belongs to Logical Channel Group 1, wherein the Logical Channel Group 1 also includes Logical Channel 2, Logical Channel 3 and Logical Channel 4, a signaling corresponding to Logical Channel 2 includes a trigger condition indication, and signalings corresponding to Logical Channel 3 and Logical Channel 4 do not include the trigger condition indication. When Logical Channel 1 meets the conditions for triggering the second BSR, the second BSR is triggered. The second BSR may include a total amount of data to be transmitted in Logical Channel 1, Logical Channel 3 and Logical Channel 4.

In the embodiment, for a logical channel which has a higher priority and is not pre-configured with uplink resources by the base station, the second BSR can be triggered when the above conditions are met, so that the amount of the data to be transmitted in the logical channel can be reported through the BSR to the base station in time and the base station can allocate uplink resources timely, thereby reducing transmission delay of the uplink data in the logical channel.

Figure 6:
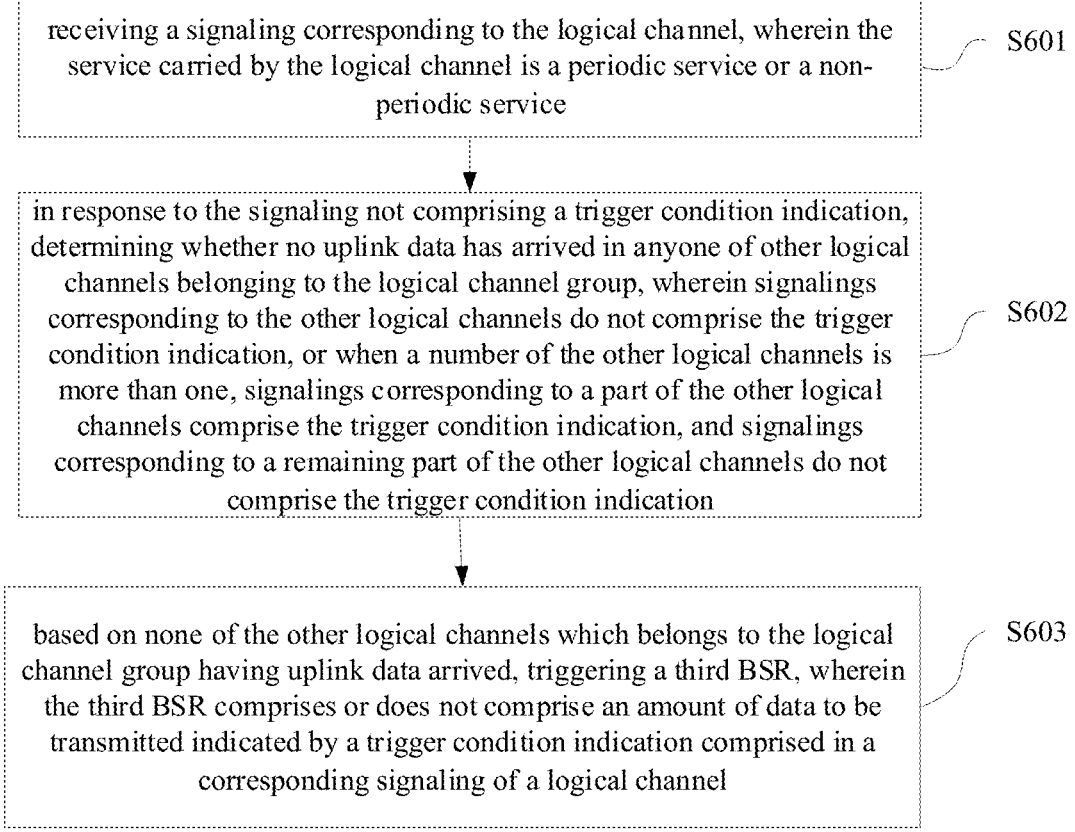
FIG. 6 schematically illustrates a flow chart of a method for triggering a BSR according to another embodiment.

FIG. 6 schematically illustrates a flow chart of a method for triggering a BSR according to another embodiment. In addition to the steps shown in FIG. 1, the method for triggering a BSR also include the following steps:

S601: receiving the signaling corresponding to the logical channel, wherein the service carried by the logical channel is a periodic service or a non-periodic service;

S602: in response to the signaling not including a trigger condition indication, determining whether no uplink data has arrived in anyone of other logical channels belonging to the logical channel group, wherein signalings corresponding to the other logical channels do not include the trigger condition indication, or when a number of the other logical channels is more than one, signalings corresponding to a part of the other logical channels include the trigger condition indication, and signalings corresponding to a remaining part of the other logical channels do not include the trigger condition indication; and S603: If no uplink data has arrived in anyone of the other logical channels belonging to the logical channel group, triggering a third BSR, wherein the third BSR includes or does not include an amount of data to be transmitted indicated by a trigger condition indication included in a corresponding signaling of a logical channel.

According to the embodiment, if no uplink data has arrived in anyone of the other logical channels belonging to the logical channel group, the third BSR is triggered. The third BSR may include or may not include an amount of data to be transmitted indicated by the trigger condition indication included in a corresponding signaling of a logical channel.

Figure 7:
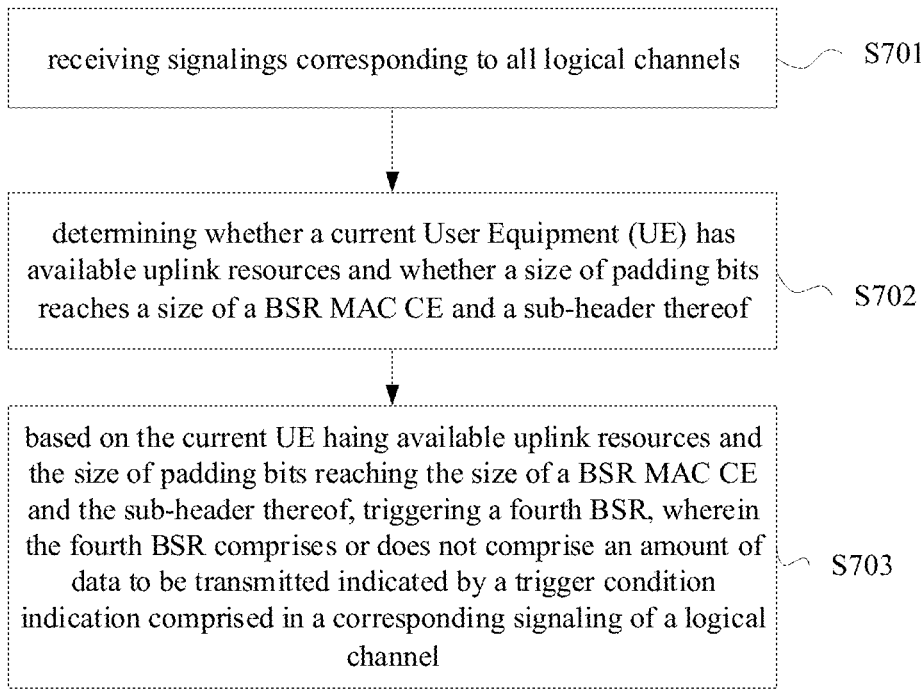
FIG. 7 schematically illustrates a flow chart of a method for triggering a BSR according to another embodiment.

FIG. 7 schematically illustrates a flow chart of a method for triggering a BSR according to another embodiment. In addition to the steps shown in FIG. 1, the method for triggering a BSR also include the following steps:

S701: receiving signalings corresponding to all logical channels;

S702: determining whether a current UE has available uplink resources and whether a size of padding bits reaches a size of a BSR MAC CE and a sub-header thereof; and S703: if the current UE has available uplink resources and the size of padding bits reaches the size of a BSR MAC CE and the sub-header thereof, triggering a fourth BSR, wherein the fourth BSR includes or does not include an amount of data to be transmitted indicated by a trigger condition indication included in a corresponding signaling of a logical channel.

In the embodiment, the padding bits refer to the remaining uplink resources after the current UE allocates uplink resources to the data to be transmitted currently. That the size of the padding bits reaches the size of the BSR MAC CE and the sub-header thereof means that the size of the padding bits is sufficient to carry the BSR and sub-headers thereof, so the fourth BSR can be triggered.

Figure 8:
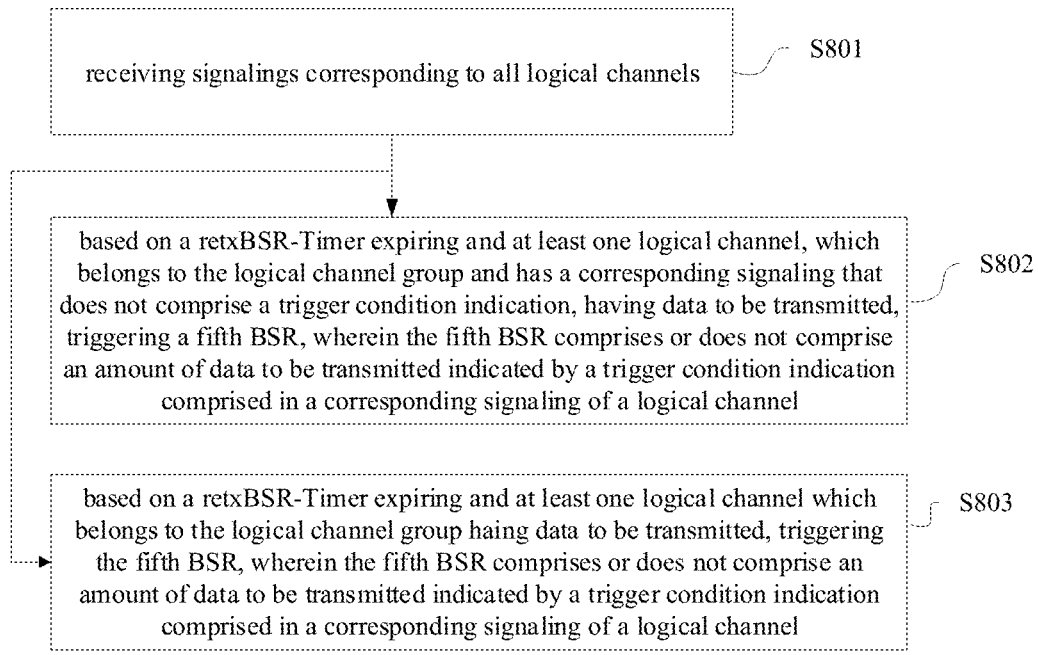
FIG. 8 schematically illustrates a flow chart of a method for triggering a BSR according to another embodiment.

FIG. 8 schematically illustrates a flow chart of a method for triggering a BSR according to another embodiment. In addition to the steps shown in FIG. 1, the method for triggering a BSR also include the following steps:

S801: receiving signalings corresponding to all logical channels;

S802: if a retxBSR-Timer expires and at least one logical channel, which belongs to the logical channel group and has a corresponding signaling that does not include the trigger condition indication, has data to be transmitted, a fifth BSR is triggered, wherein the fifth BSR includes or does not include an amount of data to be transmitted indicated by a trigger condition indication included in a corresponding signaling of a logical channel; or S803: if a retxBSR-Timer expires and at least one logical channel which belongs to the logical channel group has data to be transmitted, a fifth BSR is triggered, wherein the fifth BSR includes or does not include an amount of data to be transmitted indicated by a trigger condition indication included in a corresponding signaling of a logical channel.

It should be noted that in the embodiment of the present disclosure, one of S802 and step S803 is selected for execution.

In an embodiment of performing S803, if the retxBSR-Timer expires and at least one logical channel, which belongs to the logical channel group and has a corresponding signaling that includes or does not include the trigger condition indication, has data to be transmitted, the fifth BSR is triggered.

According to the embodiments, if the retxBSR-Timer expires and at least one logical channel, which belongs to the logical channel group and has a corresponding signaling that does not include the trigger condition indication, has data to be transmitted, a fifth BSR is triggered, so that relevant informations of the data to be transmitted can be reported to the base station in time through the fifth BSR.

Figure 9:
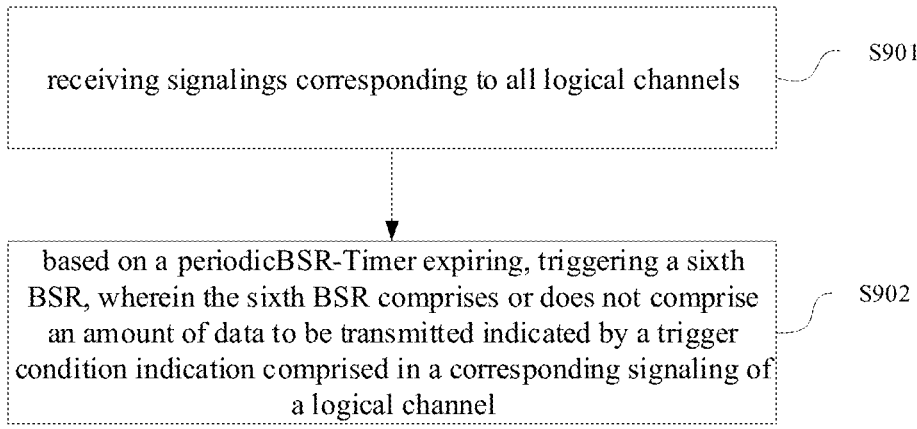
FIG. 9 schematically illustrates a flow chart of a method for triggering a BSR according to another embodiment.

FIG. 9 schematically illustrates a flow chart of a method for triggering a BSR according to another embodiment. In addition to the steps shown in FIG. 1, the method for triggering a BSR also include the following steps:

S901: receiving signalings corresponding to all logical channels;

S902: if a periodicBSR-Timer expires, a sixth BSR is triggered, wherein the sixth BSR includes or does not include an amount of data to be transmitted indicated by a trigger condition indication included in a corresponding signaling of a logical channel.

According to the embodiment, if the periodicBSR-Timer expires, the sixth BSR is triggered, so that relevant informations of the data to be transmitted can be reported to the base station in time through the sixth BSR. The sixth BSR includes or does not include an amount of data to be transmitted indicated by a trigger condition indication included in a corresponding signaling of a logical channel.

In an application scenario of the present disclosure, any one of the following events will trigger a BSR: in an MAC entity, an LCH belonging to a certain LCG has a newly arrived uplink data; and 1. If the uplink data belongs to an LCH configured with a dataVolume field and a part of an amount of the uplink data exceeding a fixed value is greater than a first preset threshold (that is, a value of the dataVolume), a BSR is triggered, wherein the BSR includes the amount of data to be transmitted on the LCH;
2. If the uplink data belongs to an LCH which is not configured with a dataVolume field, and a priority of the LCH is higher than a priority of any LCH that belongs to the certain LCG and has uplink data to be transmitted and is not configured with the dataVolume field, a BSR is triggered, wherein the BSR does not include or includes an amount of data to be transmitted on an LCH configured with the dataVolume field;
3. If the uplink data belongs to an LCH that is not configured with a dataVolume field, and all LCHs which belong to the certain LCG and not configured with the dataVolume field have no uplink data to be transmitted, a BSR is triggered, wherein the BSR does not include or includes an amount of data to be transmitted on an LCH configured with the dataVolume field;
4. If there are remaining uplink resources and a size of padding bits is greater than or equal to a size of a BSR MAC CE and a sub-header thereof, a BSR is triggered, wherein the BSR does not include or includes an amount of data to be transmitted on an LCH configured with the dataVolume field;
5. If a retxBSR-Timer expires and at least one LCH which is configured with LCG and not configured with a dataVolume field has uplink data to be transmitted, a BSR is triggered, wherein the BSR does not include or includes an amount of data to be transmitted on an LCH configured with the dataVolume field; or
6. If a periodicBSR-Timer expires, a BSR is triggered, wherein the BSR does not include or includes an amount of data to be transmitted on an LCH configured with the dataVolume field.

In an application scenario of the present disclosure, any one of the following events will trigger a BSR: in an MAC entity, an LCH belonging to a certain LCG has a newly arrived uplink data; and
1. If the uplink data belongs to an LCH which is configured with a timeGap field, and a time difference between an arrival time point of the uplink data and a periodic time point of a flow determined by a fixed offset and a fixed period is greater than a second threshold, for example, a time difference between the arrival time point of the uplink data and a next periodic time point after the arrival time point of the uplink data is greater than the second threshold (that is, a value of the timeGap), a BSR is triggered, wherein the BSR includes an amount of data to be transmitted on the LCH;
2. If the uplink data belongs to an LCH which is not configured with a timeGap field, and a priority of the LCH is higher than a priority of any LCH that belongs to the certain LCG and has uplink data to be transmitted and is not configured with the timeGap field, a BSR is triggered, wherein the BSR does not include or includes an amount of data to be transmitted on an LCH configured with the timeGap field;
3. If the uplink data belongs to an LCH that is not configured with a timeGap field, and all LCHs which belong to the certain LCG and not configured with the timeGap field have no uplink data to be transmitted, a BSR is triggered, wherein the BSR does not include or includes an amount of data to be transmitted on an LCH configured with the timeGap field;
4. If there are remaining uplink resources and a size of padding bits is greater than or equal to a size of a BSR MAC CE and a sub-header thereof, a BSR is triggered, wherein the BSR does not include or includes an amount of data to be transmitted on an LCH configured with the timeGap field;
5. If a retxBSR-Timer expires and at least one LCH which is configured with LCG and not configured with a timeGap field has uplink data to be transmitted, a BSR is triggered, wherein the BSR does not include or includes an amount of data to be transmitted on an LCH configured with the timeGap field; or
6. If a periodicBSR-Timer expires, a BSR is triggered, wherein the BSR does not include or includes an amount of data to be transmitted on an LCH configured with the timeGap field.

Figure 10:
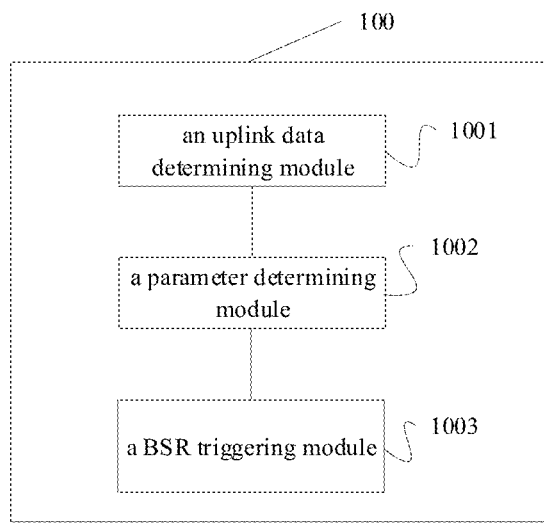
FIG. 10 schematically illustrates a structural diagram of a device for triggering a BSR according to an embodiment.

FIG. 10 schematically illustrates a structural diagram of a device for triggering a BSR 100 according to an embodiment. The device 100 includes an uplink data determining module 1001, a parameter determining module 1002, and a BSR triggering module 1003.

In some embodiments, the uplink data determining module 1001 is adapted to determine an uplink data arriving at one time in a Media Access Control (MAC) entity, wherein the uplink data corresponds to a Logical Channel (LCH), the logical channel belongs to a Logical Channel Group (LCG), an amount of data arriving each time in a periodic service is a fixed value, and the periodic service has a transmission period and a time offset; the parameter determining module 1002 is adapted to determine a fixed value corresponding to an amount of data arriving each time in the logical channel, and determine a transmission period and a time offset of a service carried by the logical channel; and the BSR triggering module 1003 is adapted to determine periodic time points according the transmission period and the time offset, and if a part of an amount of the uplink data exceeding the fixed value reaches a first preset threshold or if a time difference between a time point when the uplink data arrives and a next periodic time point after the time point when the uplink data arrives reaches a second preset threshold, trigger a first BSR, wherein the first BSR includes the amount of the uplink data.

According to the embodiments of the present disclosure, for an uplink data having both periodicity and jitter characteristics, only when a jitter occurs (that is, an amount of an uplink data that arrives at one time exceeds a fixed value and an excess amount reaches a first preset threshold, or a time difference between an arrival time point of the uplink data and a next periodic time point after the arrival time point reaches a second preset threshold), a first BSR will be triggered, which can avoid waste of uplink resources by sending unnecessary BSRs on the uplink resources when jitter does not occur; and the amount of the uplink data is reported through the first BSR, so that a base station can obtain the amount of the uplink data which is affected by the jitter and is unknown to the base station and then can configure a corresponding uplink resource for the uplink data, thereby ensuring timely and effective transmission of the uplink data and reducing data transmission delay.

Principles, detailed implementation and advantages of the BSR triggering device 100 can be found in the above descriptions of the method as shown in FIG. 1 to FIG. 9, and are not described here.

In an embodiment of the present disclosure, a storage medium having computer instructions stored therein is provided, wherein once the computer instructions are executed, the above method as shown in FIG. 1 to FIG. 9 is performed. The storage medium may include a Read Only Memory (ROM), a Random Access Memory (RAM), a magnetic disk, an optical disk or the like. Alternatively, the storage medium may include a non-volatile or non-transitory memory or the like.

In an embodiment of the present disclosure, a user equipment including a memory and a processor is provided, wherein the memory has computer instructions stored therein, and when the processor executes the computer instructions, the above method as shown in FIG. 1 to FIG. 9 is performed. The user equipment may include but not limited to a mobile phone, a computer or a tablet computer.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:
1. A method for triggering a Buffer State Report (BSR), comprising:
determining an uplink data arriving at one time in a Media Access Control (MAC) entity, wherein the uplink data corresponds to a Logical Channel (LCH), and the logical channel belongs to a Logical Channel Group (LCG);
determining a fixed value corresponding to an amount of data arriving each time in the logical channel, and determining a transmission period and a time offset of a periodic service carried by the logical channel, wherein the fixed value corresponding to the amount of data represents an amount of data that should arrive each time in the periodic service, and the time offset represents an offset between a time point of a data arrival and a reference time; and determining periodic time points according to the transmission period and the time offset, and based on a part of an amount of the uplink data which exceeds the fixed value reaching a first preset threshold or a time difference between a time point of arrival of the uplink data and a next periodic time point after the time point of arrival of the uplink data reaching a second preset threshold, triggering a first BSR, wherein the first BSR comprises the amount of the uplink data.

2. The method according to claim 1, wherein traffic patterns of the logical channel are sent to a base station in advance and are successfully received by the base station.

3. The method according to claim 1, further comprising: receiving one or more signalings corresponding to one or more logical channels.

4. The method according to claim 3, wherein said triggering a first BSR comprises:

in response to the one or more signalings comprising a trigger condition indication, determining whether the part of the amount of the uplink data exceeding the fixed value reaches the first preset threshold, wherein the trigger condition indication comprises the first preset threshold; and based on the part of the amount of the uplink data which exceeds the fixed value reaching the first preset threshold, triggering the first BSR.

5. The method according to claim 3, wherein said triggering a first BSR comprises:

in response to the one or more signalings comprising a trigger condition indication, determining periodic time points according to the transmission period and the time offset, and determining whether a time difference between a time point when the uplink data arrives and a next periodic time point after the time point when the uplink data arrives reaches a second preset threshold, wherein the trigger condition indication comprises the second preset threshold; and based on the time difference between the time point of arrival of the uplink data and the next periodic time point after arrival of the time point reaching the second preset threshold, triggering the first BSR.

6. The method according to claim 3, wherein the service carried by the logical channel is a periodic service or a non-periodic service, and the method further comprises:

in response to the one or more signalings not comprising a trigger condition indication, determining whether a priority of the logical channel is higher than priorities of other logical channels which belong to the logical channel group and have data to be transmitted, wherein signalings corresponding to the other logical channels do not comprise the trigger condition indication, or when a number of the other logical channels is more than one, signalings corresponding to a part of the other logical channels comprise the trigger condition indication, and signalings corresponding to a remaining part of the other logical channels do not comprise the trigger condition indication; and based on the priority of the logical channel higher than the priorities of the other logical channels which belong to the logical channel group and have data to be transmitted, triggering a second BSR, wherein the second BSR comprises or does not comprise an amount of data to be transmitted indicated by a trigger condition indication comprised in a corresponding signaling of a logical channel.

7. The method according to claim 3, wherein the service carried by the logical channel is a periodic service or a non-periodic service, and the method further comprises:

in response to the one or more signalings not comprising a trigger condition indication, determining whether no uplink data has arrived in anyone of other logical channels belonging to the logical channel group, wherein signalings corresponding to the other logical channels do not comprise the trigger condition indication, or when a number of the other logical channels is more than one, signalings corresponding to a part of the other logical channels comprise the trigger condition indication, and signalings corresponding to a remaining part of the other logical channels do not comprise the trigger condition indication; and based on none of the other logical channels which belongs to the logical channel group having uplink data arrived, triggering a third BSR, wherein the third BSR comprises or does not comprise an amount of data to be transmitted indicated by a trigger condition indication comprised in a corresponding signaling of a logical channel.

8. The method according to claim 3, wherein the one or more signalings correspond to all logical channels, and the method further comprises:

determining whether a current User Equipment (UE) has available uplink resources and whether a size of padding bits reaches a size of a BSR MAC CE and a sub-header thereof; and based on the current UE having available uplink resources and the size of padding bits reaching the size of a BSR MAC CE and the sub-header thereof, triggering a fourth BSR, wherein the fourth BSR comprises or does not comprise an amount of data to be transmitted indicated by a trigger condition indication comprised in a corresponding signaling of a logical channel.

9. The method according to claim 3, wherein the one or more signalings correspond to all logical channels, and the method further comprises:

based on a retxBSR-Timer expiring and at least one logical channel, which belongs to the logical channel group and has a corresponding signaling that does not comprise a trigger condition indication, having data to be transmitted, triggering a fifth BSR, wherein the fifth BSR comprises or does not comprise an amount of data to be transmitted indicated by a trigger condition indication comprised in a corresponding signaling of a logical channel; or based on a retxBSR-Timer expiring and at least one logical channel which belongs to the logical channel group having data to be transmitted, triggering the fifth BSR, wherein the fifth BSR comprises or does not comprise an amount of data to be transmitted indicated by a trigger condition indication comprised in a corresponding signaling of a logical channel.

10. The method according to claim 3, wherein the one or more signalings correspond to all logical channels, and the method further comprises:

based on a periodicBSR-Timer expiring, triggering a sixth BSR, wherein the sixth BSR comprises or does not comprise an amount of data to be transmitted indicated by a trigger condition indication comprised in a corresponding signaling of a logical channel.

11. The method according to claim 3, wherein the one or more signalings comprise: a Radio Resource Control (RRC) signaling, a MAC signaling, a physical layer signaling or a logical channel configuration signaling.

12. A non-transitory computer readable storage medium storing one or more programs, the one or more programs comprising instructions, which, when executed by an electronic device with one or more processors and a plurality of input devices, cause the electronic device to:
determine an uplink data arriving at one time in a Media Access Control (MAC) entity, wherein the uplink data corresponds to a Logical Channel (LCH), and the logical channel belongs to a Logical Channel Group (LCG);
determine a fixed value corresponding to an amount of data arriving each time in the logical channel, and determine a transmission period and a time offset of a service carried by the logical channel, wherein the fixed value corresponding to the amount of data represents an amount of data that should arrive each time in the periodic service, and the time offset represents an offset between a time point of a data arrival and a reference time; and
determine periodic time points according to the transmission period and the time offset, and based on a part of an amount of the uplink data which exceeds the fixed value reaching a first preset threshold or a time difference between a time point of arrival of the uplink data and a next periodic time point after the time point of arrival of the uplink data reaching a second preset threshold, trigger a first BSR, wherein the first BSR comprises the amount of the uplink data.

13. The non-transitory computer readable storage medium according to claim 12, wherein traffic patterns of the logical channel are sent to a base station in advance and are successfully received by the base station.

14. The non-transitory computer readable storage medium according to claim 12, wherein the electronic device is further caused to:
receive one or more signalings corresponding to one or more logical channels.

15. The non-transitory computer readable storage medium according to claim 14, wherein the one or more signalings comprise: a Radio Resource Control (RRC) signaling, a MAC signaling, a physical layer signaling or a logical channel configuration signaling.

16. The non-transitory computer readable storage medium according to claim 15, wherein said triggering a first BSR comprises:
in response to a signaling which corresponds to the logical channel comprising a trigger condition indication, determining whether the part of the amount of the uplink data exceeding the fixed value reaches the first preset threshold, wherein the trigger condition indication comprises the first preset threshold; and
based on the part of the amount of the uplink data which exceeds the fixed value reaching the first preset threshold, triggering the first BSR.

17. The non-transitory computer readable storage medium according to claim 15, wherein said triggering a first BSR comprises:
in response to a signaling which corresponds to the logical channel comprising a trigger condition indication, determining periodic time points according to the transmission period and the time offset, and determining whether a time difference between a time point when the uplink data arrives and a next periodic time point after the time point when the uplink data arrives reaches a second preset threshold, wherein the trigger condition indication comprises the second preset threshold; and
based on the time difference between the time point of arrival of the uplink data and the next periodic time point after arrival of the time point reaching the second preset threshold, triggering the first BSR.

18. The non-transitory computer readable storage medium according to claim 15, wherein the electronic device is further caused to:
in response to a signaling which corresponds to the logical channel not comprising a trigger condition indication, wherein the service carried by the logical channel is a periodic service or a non-periodic service, determine whether a priority of the logical channel is higher than priorities of other logical channels which belong to the logical channel group and have data to be transmitted, wherein signalings corresponding to the other logical channels do not comprise the trigger condition indication, or when a number of the other logical channels is more than one, signalings corresponding to a part of the other logical channels comprise the trigger condition indication, and signalings corresponding to a remaining part of the other logical channels do not comprise the trigger condition indication; and
based on the priority of the logical channel higher than the priorities of the other logical channels which belong to the logical channel group and have data to be transmitted, trigger a second BSR, wherein the second BSR comprises or does not comprise an amount of data to be transmitted indicated by a trigger condition indication comprised in a corresponding signaling of a logical channel.

19. The non-transitory computer readable storage medium according to claim 15, wherein the electronic device is further caused to:
in response to a signaling which corresponds to the logical channel not comprising a trigger condition indication, wherein the service carried by the logical channel is a periodic service or a non-periodic service, determine whether no uplink data has arrived in anyone of other logical channels belonging to the logical channel group, wherein signalings corresponding to the other logical channels do not comprise the trigger condition indication, or when a number of the other logical channels is more than one, signalings corresponding to a part of the other logical channels comprise the trigger condition indication, and signalings corresponding to a remaining part of the other logical channels do not comprise the trigger condition indication; and
based on none of the other logical channels which belongs to the logical channel group having uplink data arrived, trigger a third BSR, wherein the third BSR comprises or does not comprise an amount of data to be transmitted indicated by a trigger condition indication comprised in a corresponding signaling of a logical channel.

20. A user equipment comprising a memory and a processor, wherein the memory has computer instructions stored therein, and when the computer instructions are executed by the processor, the processor is caused to:
determine an uplink data arriving at one time in a Media Access Control (MAC) entity, wherein the uplink data corresponds to a Logical Channel (LCH), and the logical channel belongs to a Logical Channel Group (LCG);

determine a fixed value corresponding to an amount of data arriving each time in the logical channel, and determine a transmission period and a time offset of a service carried by the logical channel, wherein the fixed value corresponding to the amount of data represents an amount of data that should arrive each time in the periodic service, and the time offset represents an offset between a time point of a data arrival and a reference time; and determine periodic time points according to the transmission period and the time offset, and based on a part of an amount of the uplink data which exceeds the fixed value reaching a first preset threshold or a time difference between a time point of arrival of the uplink data and a next periodic time point after the time point of arrival of the uplink data reaching a second preset threshold, trigger a first BSR, wherein the first BSR comprises the amount of the uplink data.

* * * * *